Figure 1:
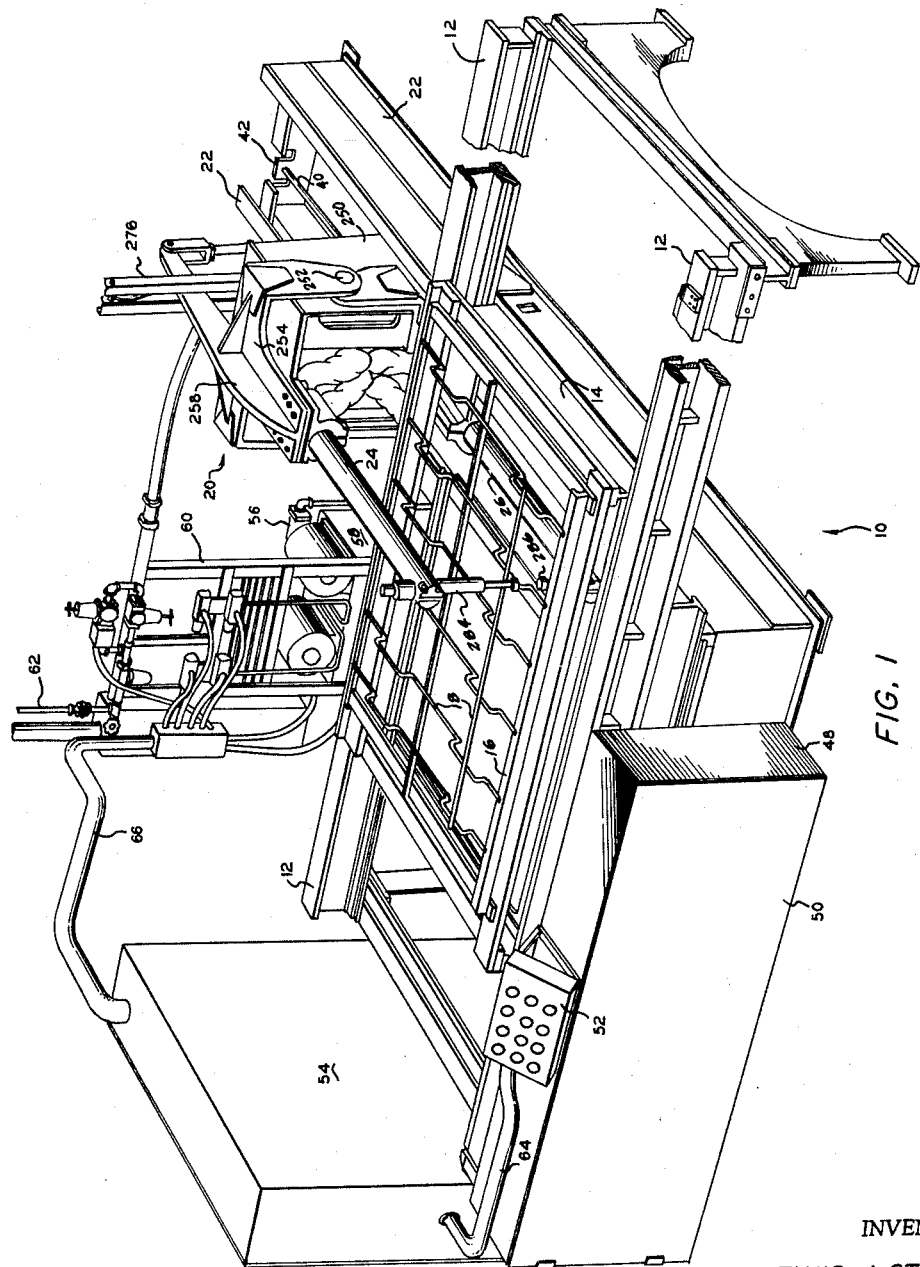

INVENTORS
LEWIS J. STERN
FRANCIS W. FREY
ATTORNEY

Dec. 22, 1964  L. J. STERN ETAL  3,162,744
AUTOMATIC WELDING APPARATUS
Filed Sept. 26, 1961  13 Sheets-Sheet 2

INVENTORS
LEWIS J. STERN
FRANCIS W. FREY
BY Beaman & Beaman
ATTORNEY

Dec. 22, 1964   L. J. STERN ETAL   3,162,744
AUTOMATIC WELDING APPARATUS
Filed Sept. 26, 1961   13 Sheets-Sheet 3
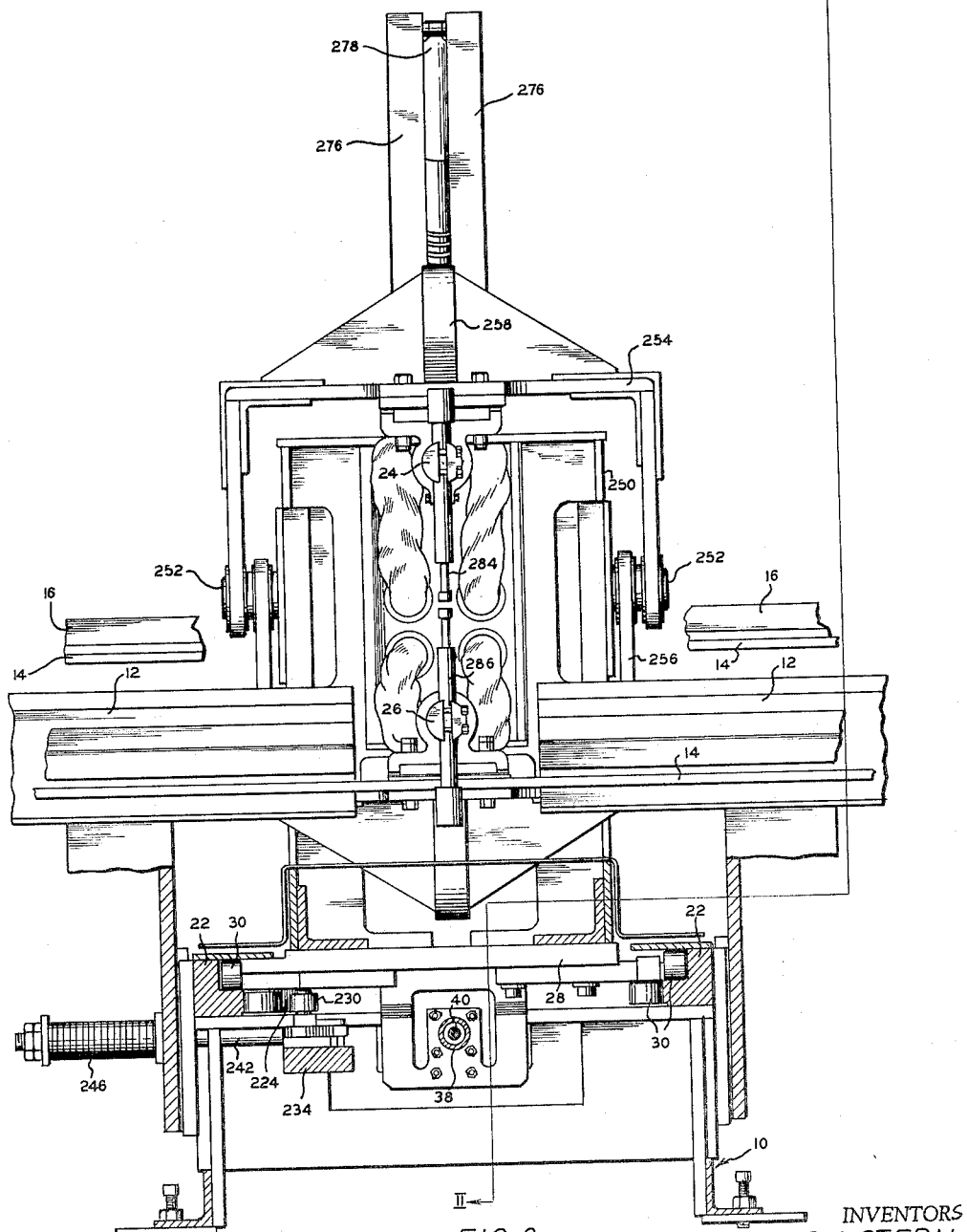
FIG.3
INVENTORS
LEWIS J. STERN
FRANCIS W. FREY
ATTORNEY Dec. 22, 1964    L. J. STERN ETAL    3,162,744
AUTOMATIC WELDING APPARATUS
Filed Sept. 26, 1961    13 Sheets-Sheet 6

INVENTORS
LEWIS J. STERN
FRANCIS W. FREY
BY Beaman & Beaman
ATTORNEY

Dec. 22, 1964   L. J. STERN ETAL   3,162,744
AUTOMATIC WELDING APPARATUS
Filed Sept. 26, 1961   13 Sheets-Sheet 7

INVENTORS
LEWIS J. STERN
FRANCIS W. FREY
BY Beaman & Beaman
ATTORNEY

Dec. 22, 1964     L. J. STERN ETAL     3,162,744
AUTOMATIC WELDING APPARATUS

Filed Sept. 26, 1961     13 Sheets-Sheet 8

INVENTORS
LEWIS J. STERN
FRANCIS W. FREY

BY Beaman + Beaman
ATTORNEY

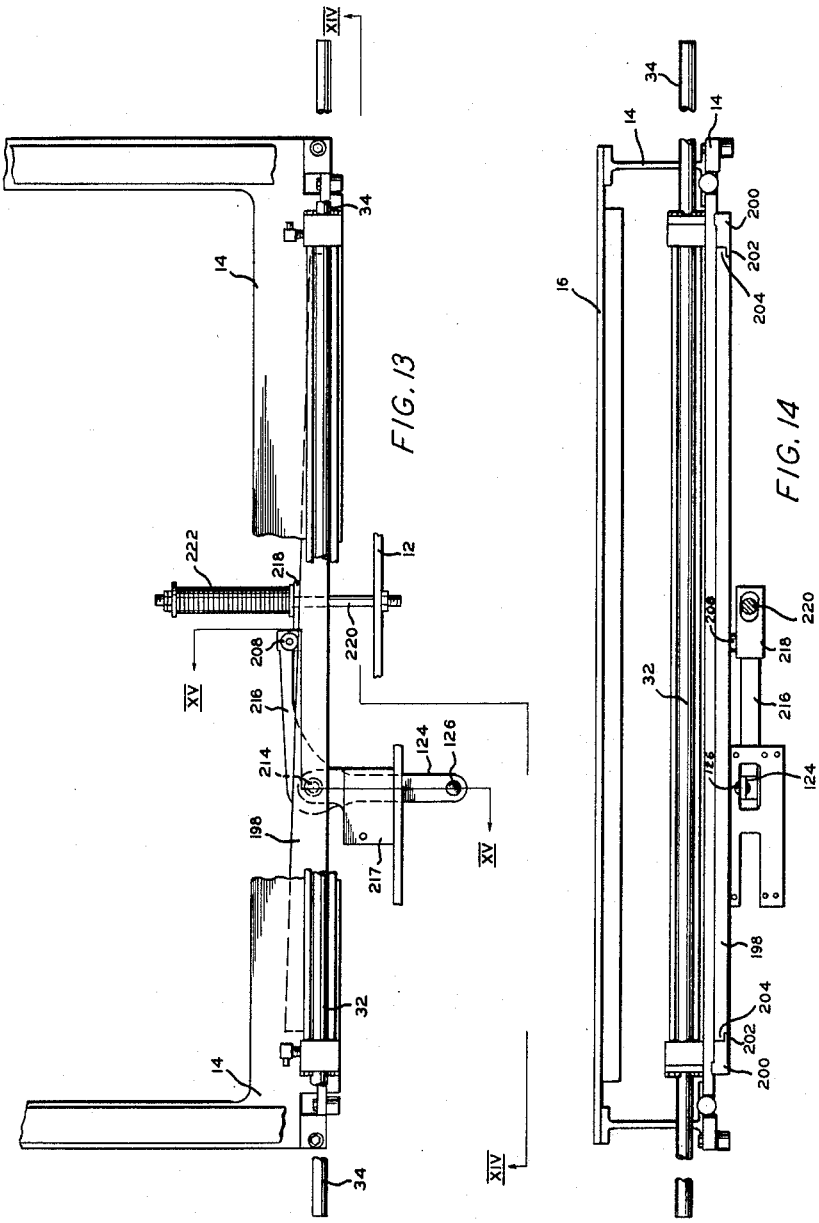

Dec. 22, 1964    L. J. STERN ETAL    3,162,744
AUTOMATIC WELDING APPARATUS
Filed Sept. 26, 1961    13 Sheets-Sheet 10

INVENTORS
LEWIS J. STERN
FRANCIS W. FREY

ATTORNEY

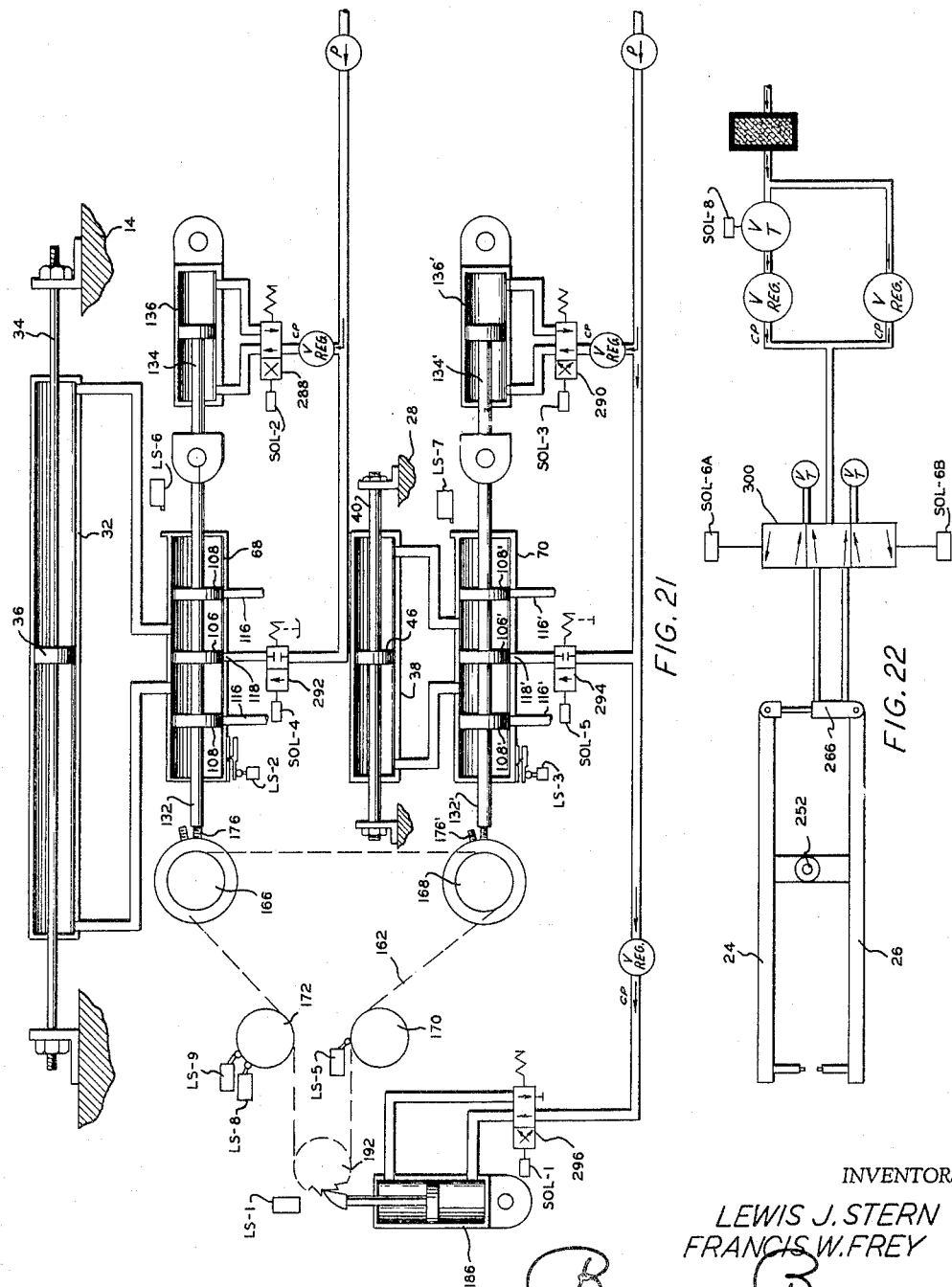

INVENTORS
LEWIS J. STERN
FRANCIS W. FREY

United States Patent Office 3,162,744
Patented Dec. 22, 1964

3,162,744
AUTOMATIC WELDING APPARATUS
Lewis J. Stern and Francis W. Frey, Adrian, Mich., assignors to Stubnitz Greene Corporation, Adrian, Mich., a corporation of Michigan
Filed Sept. 26, 1961, Ser. No. 140,884
12 Claims. (Cl. 219—80)

The invention pertains to automatic welding machines and particularly relates to an electric resistance welding apparatus capable of automatically successively welding a plurality of spots spaced both vertically and horizontally with respect to each other.

In the fabrication of complex welded steel frame works or members, such as automobile seat structure or the like, it is common practice to employ electric resistance spot welders forming single welds. The complexity of the shape of such wire or otherwise formed articles usually necessitates the use of the single weld machines, and as the welds are often spaced at different relative vertical and horizontal positions, the article being welded is usually held in the hands of the operator and considerable dexterity, strength, and skill is required to locate the jigged article during each weld. The combined weight of the welding jig and the article therein is considerable for a large item such as an automobile seat and, although counter-balance means are usually employed to support much of the weight of the jig and article the efficiency of the operator often decreases due to fatigue.

A basic object of the invention is to provide an automatic welding machine capable of welding complex shapes without attention from an operator and wherein the time for completing the welding of a given article is considerably shortened with respect to the time required by the conventional manual means. In the conventional practice of manufacturing automobile seats the same operator usually loads the welding jig with the seat components and performs the welding, and under this arrangement the welder will be inactive a good deal of the time. In those systems wherein one operator is welding while another operator is loading the jig, two operators are required to make optimum use of the welding apparatus. In the practice of the invention, the single operator spends all of his time loading or unloading the jig and as the loading and unloading operations take place while the welder is welding the previously loaded jig, the welder capacity is fully utilized, and the unit welding time is less than half of that with conventional equipment.

Basically, the machine of the invention includes a carriage member, upon which the jig and article to be welded are located and a welding head member. The carriage is mounted for horizontal movement in one direction, while the welding head moves in a path intersecting and transversely disposed to that of the path of movement of the carriage. By synchronizing the relative carriage and welding head movements with the operation of the electrodes on the welding head an infinite number and choice of locations of welds may be made within the horizontal area intersected by the paths of travel of the welding head and carriage. Furthermore, due to the novel construction of the welding head, welds located at different vertically disposed positions may also be formed.

It is therefore an object of the invention to provide a fully automatic electric resistance spot welding machine capable of forming a plurality of spaced welds in a programmed sequence of operations.

A further object of the invention is to provide an automatic welding mahcine capable of performing a predetermined number of welds at predetermined spaced locations wherein the article being welded is automatically shifted from a loading position to the welding position at the beginning of the welding cycle and returns to an unloading position at the end of a welding cycle.

Another object of the invention is to provide an automatic welding machine having a work article mounting carriage longitudinally movable in one direction and a welding head carriage transversely movable to said one direction wherein predetermined control means regulate movement of the carriages and control means initiate the welding action upon the attainment of the predetermined location of the carriages.

Yet a further object of the invention is to provide an automatic welding machine employing a pair of carriages movable in intersecting paths wherein hydraulic means actuate the carriages and improved control and position sensing means are operatively associated with the carriages.

Yet another object of the invention is to provide an automatic welding machine employing a pair of carriages movable in intersecting paths and welding head means are mounted upon one of said carriages, control means being employed which control the positioning of the carriages and the operation of a welding head. The control means being of such character wherein the positioning operation thereof initiates control of the welding head and repositions itself to activate the carriage moving means for the next welding position, completion of the welding operation permitting the carriage positioning means to shift the carriages to the next position determined by the control means.

An additional object of the invention is to provide an automatic welding machine incorporating a pair of carriages movable in intersecting paths wherein improved control means and carriage sensing means are associated with the carriages permitting a very high degree of accuracy in the carriage positioning.

Another object of the invention is to provide an improved welding machine of the type wherein a pair of spaced electrodes are moved toward each other, both of said electrodes being mounted for pivotal movement toward a common point.

Figure 2:
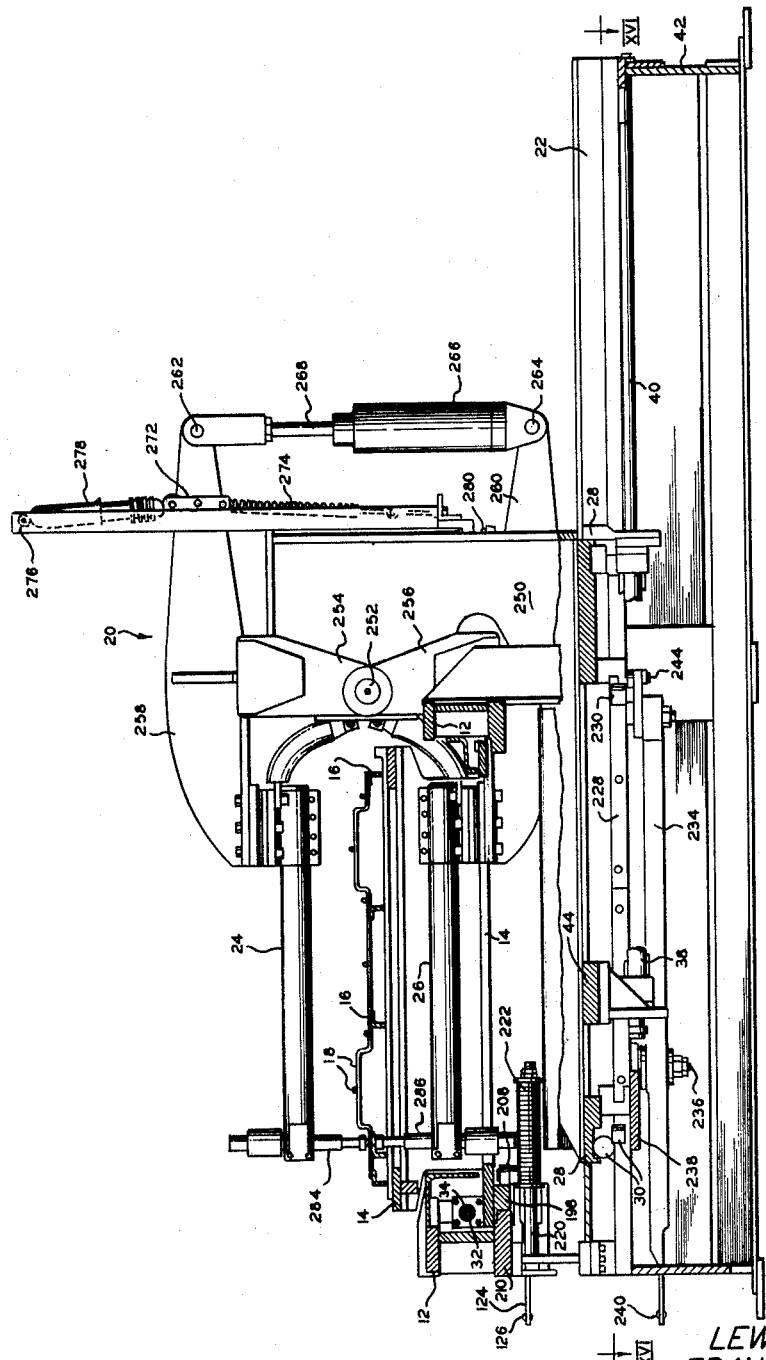
Figure 4:
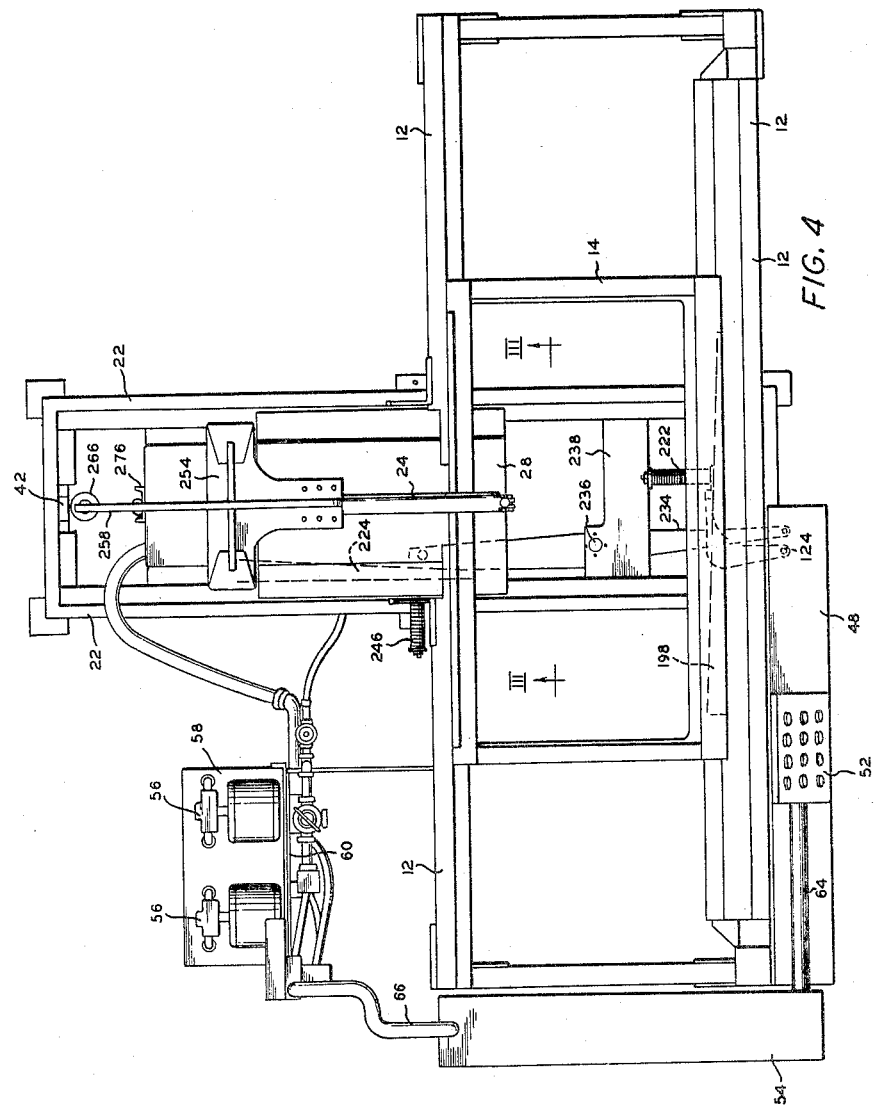
Figure 5:
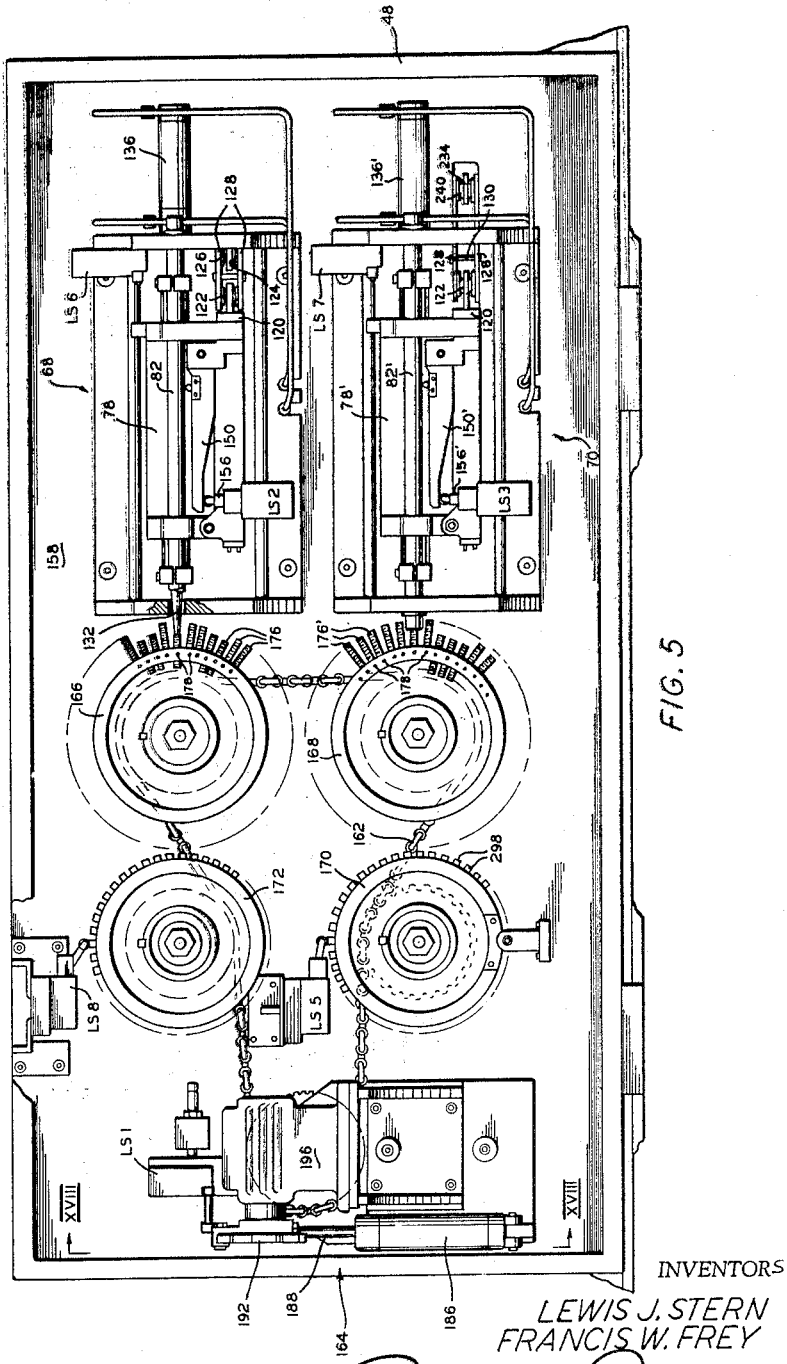
Figure 6:
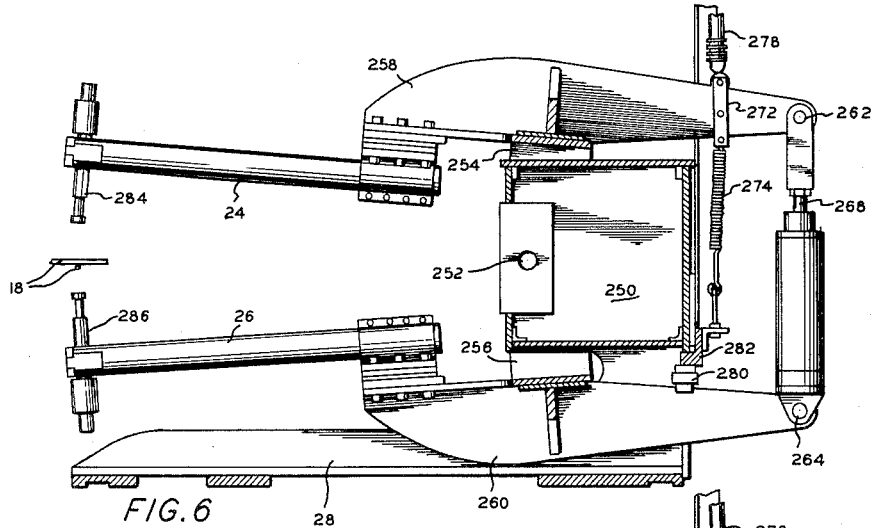
Figure 7:
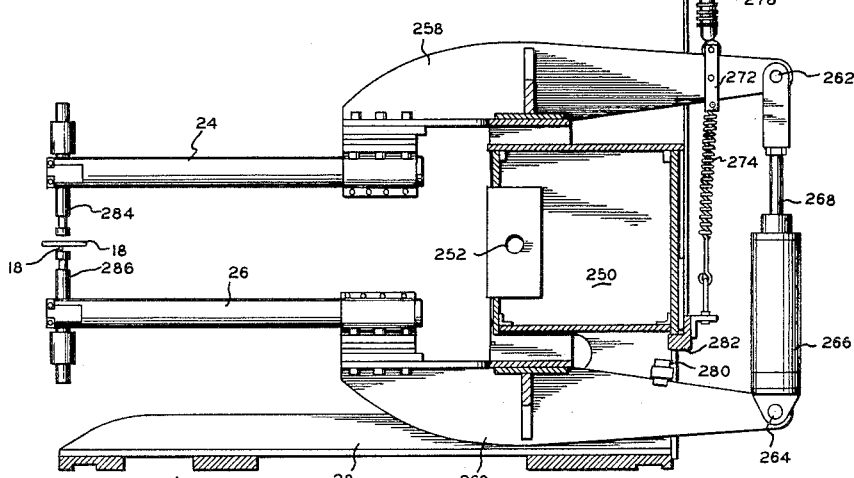
Figure 7A:
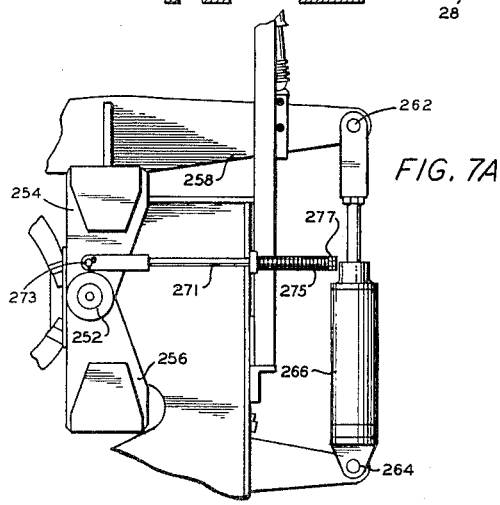
Figure 8:
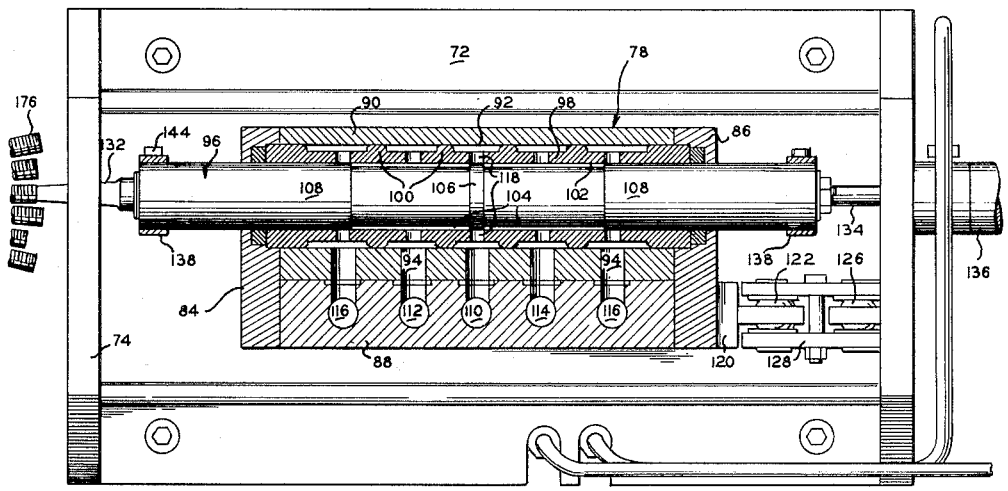
Figure 9:
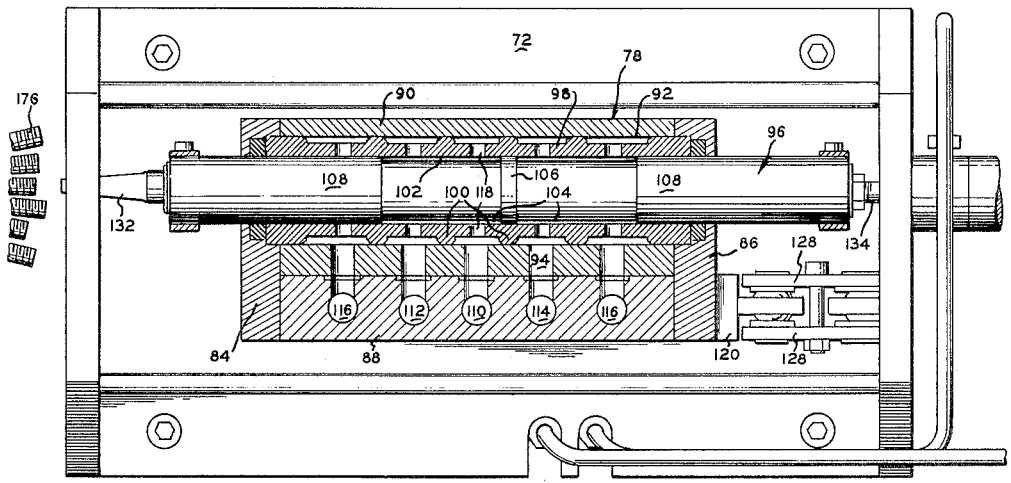
Figure 15:
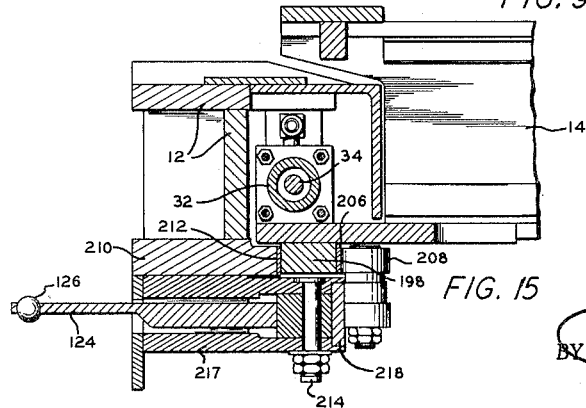
Figure 10:
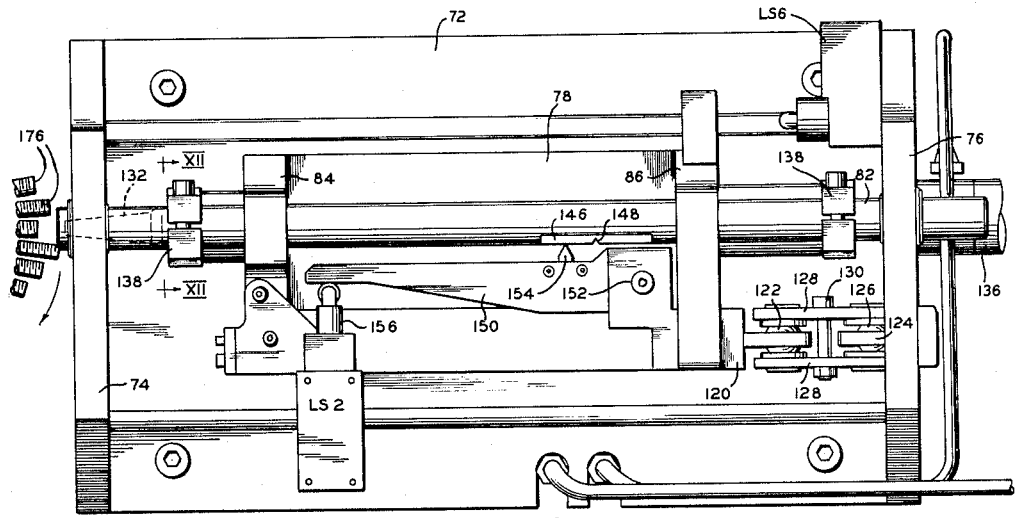
Figure 11:
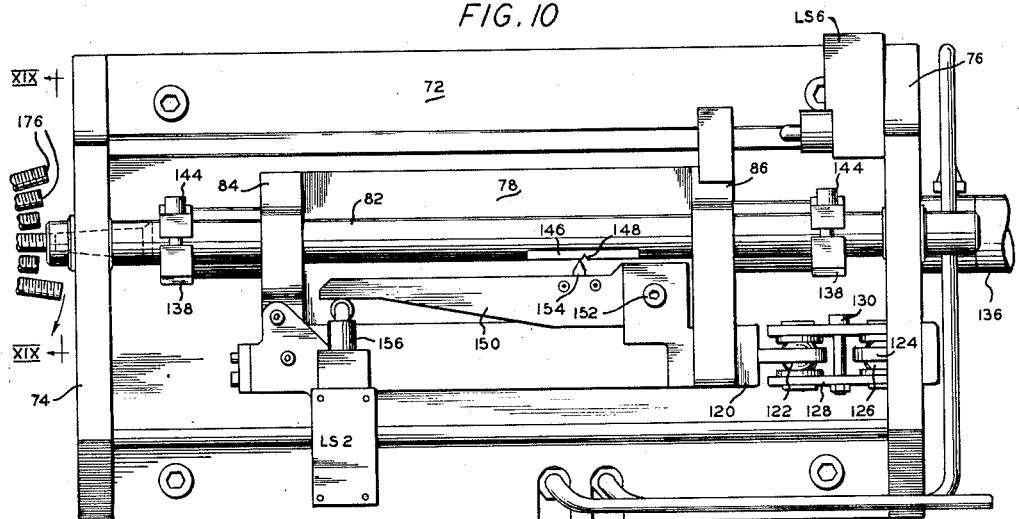
Figures 12, 19, 20:
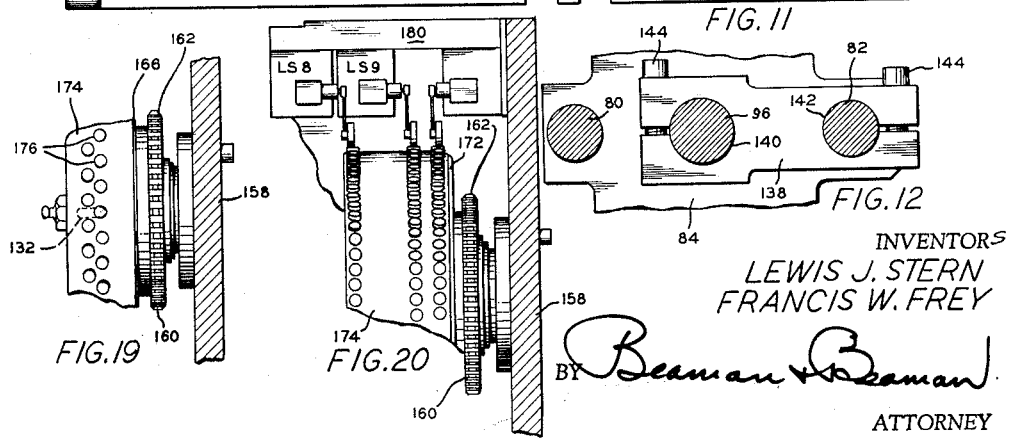
Figures 16, 17, 18:
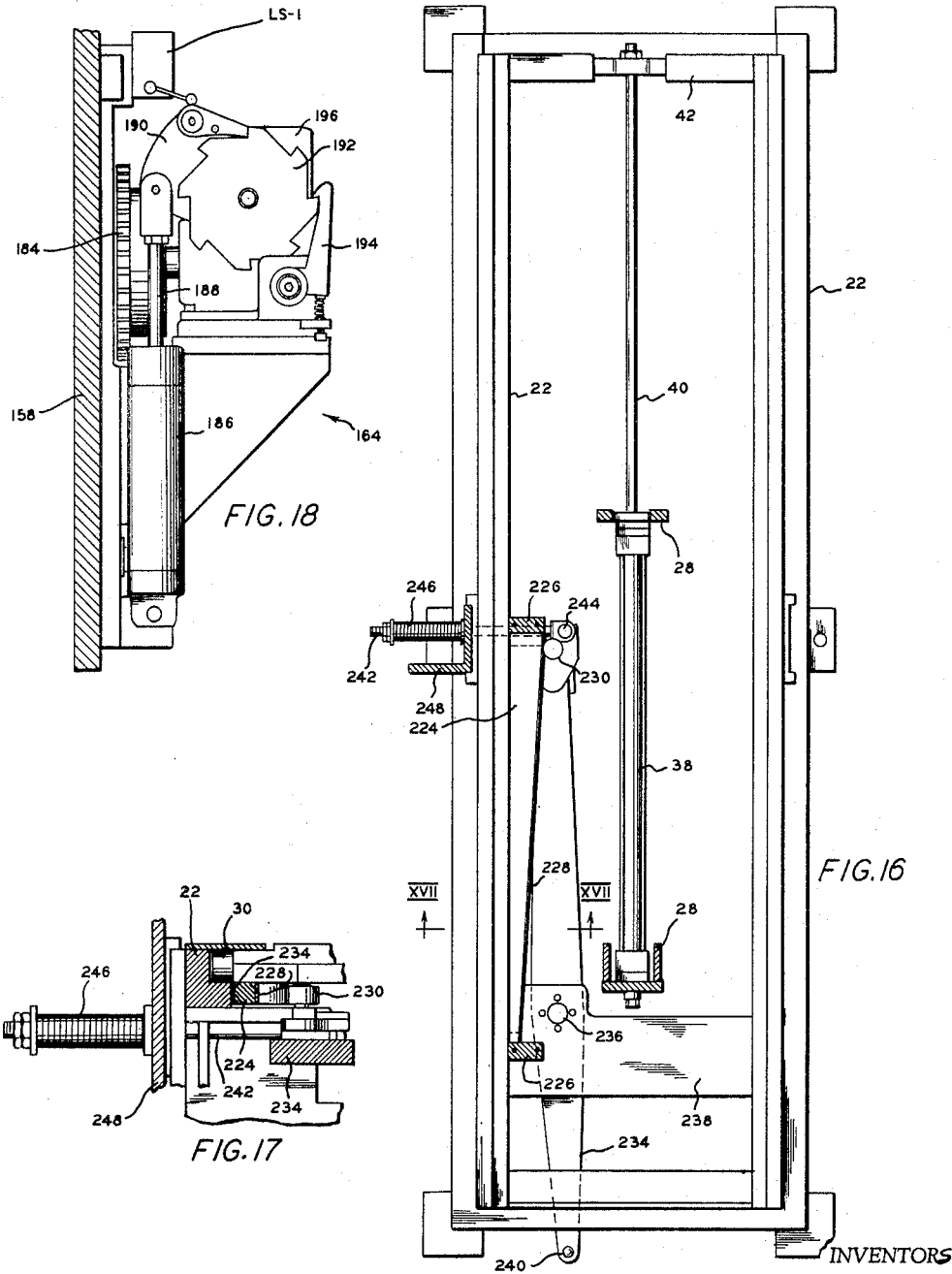
Figure 23:
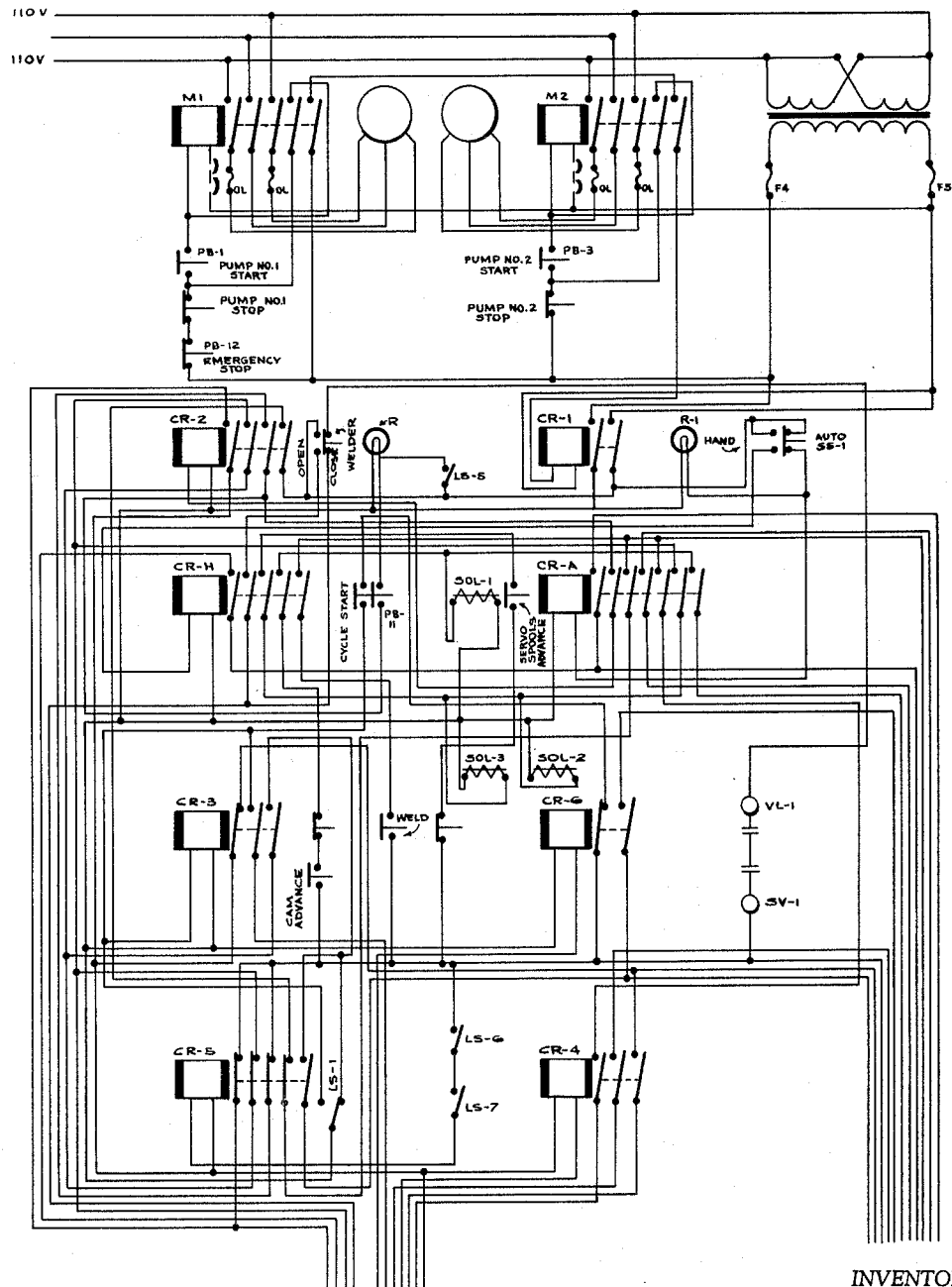
Figure 24:
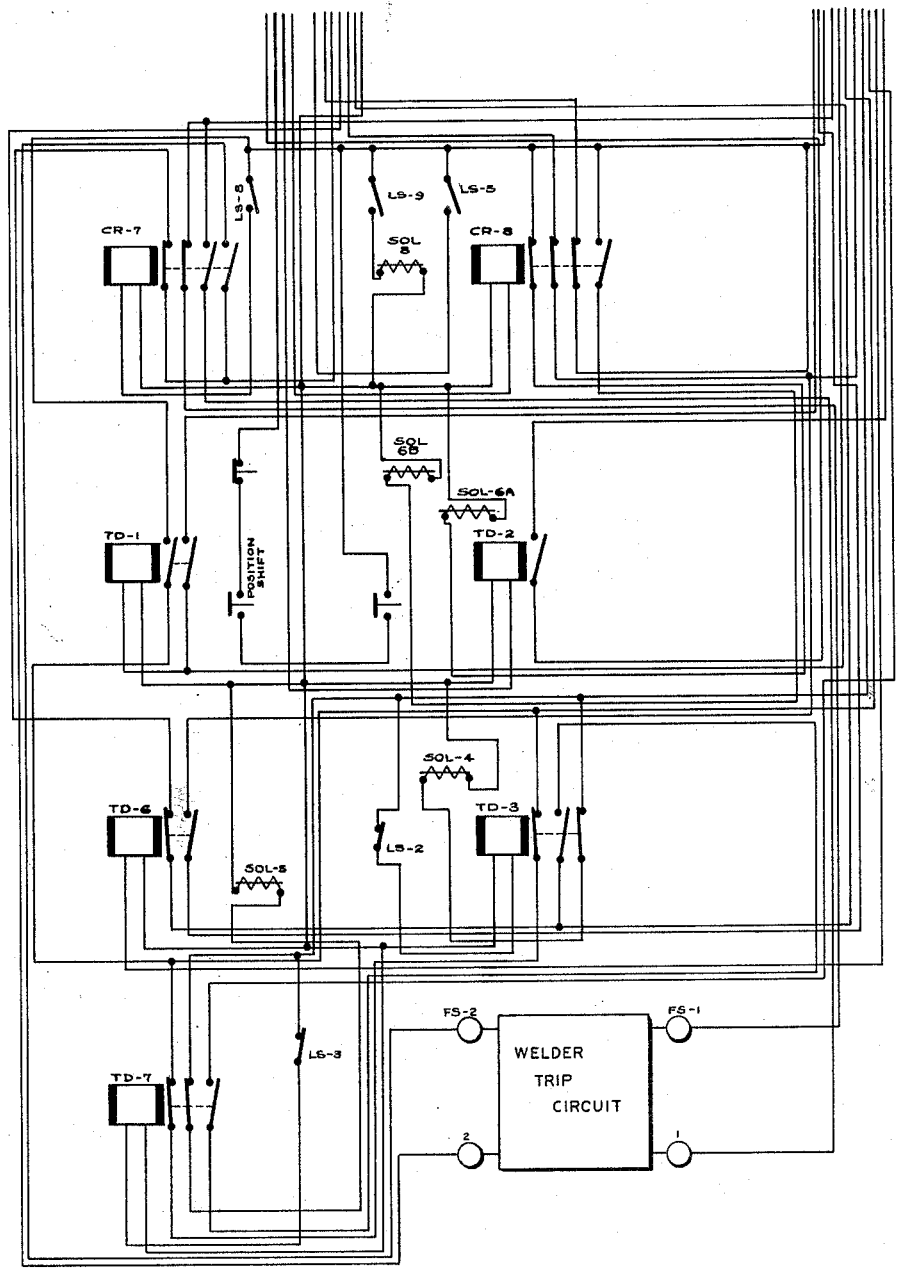

These and other objects of the invention arising from the details and the structural relationships of the components of an embodiment thereof will be apparent from the following description and accompanying drawings herein:

FIG. 1 is a perspective view of an automatic welding machine in accord with the invention showing a jigged article to be welded in the welding position, FIG. 2 is an elevational sectional side view of the invention taken along section II—II of FIG. 3 eliminating the valve control cabinet, FIG. 3 is an elevational sectional view of the central region of the machine taken along section III—III of FIG. 4 with the welded article and jig not shown, FIG. 4 is a plan view of the machine in accord with the invention not showing the welded article and jig, FIG. 5 is an elevational view of the primary control valves, control drums and actuating means therefor employed with the invention, FIG. 6 is a side elevational sectional view of the welding head electrode supporting arms shown in the open position, FIG. 7 is a detail elevational side view, partly in section, of the welder head electrode supporting arms shown at the instant the lower electrode engages the bototm member to be welded and prior to the upper electrode engaging the upper member to be welded, FIG. 7A is an elevational detail view of a variation in the electrode arm spring arrangement, FIG. 8 is an elevational view of a primary control valve, the valve components being shown in section, upon the valve spool being centered, FIG. 9 is a view similar to FIG. 8 showing the valve spool in the fully retracted position during indexing of the control drums, FIG. 10 is an elevational exterior view of a primary control valve showing the components in the fully retracted position, corresponding to FIG. 9, FIG. 11 is a view similar to FIG. 10 wherein the valve spool feeler is in engagement with a positioning screw and the carriage has not yet obtained the "home" position, FIG. 12 is a sectional end view of a primary control valve taken along section XII—XII of FIG. 10, FIG. 13 is a detail plan view of the carriage sine bar structure, partly in section, FIG. 14 is an elevational view of the carriage sine bar structure, FIG. 15 is an elevational sectional view of the carriage sine bar and cylinder arrangement as taken along section XV—XV of FIG. 13, FIG. 16 is a plan view, partly in section, of the welder head sine bar and undercarriage arrangement, FIG. 17 is an enlarged detail sectional view of the sine bar support means taken along section XVII—XVII of FIG. 16, FIG. 18 is an end view of the index motor for actuating the control drums, FIG. 19 is an enlarged detail view of the periphery of a valve control drum, FIG. 20 is a detail view of a limit switch control drum and the switches associated therewith, FIG. 21 is a schematic diagram of the fluid circuit and control switches employed with the carriages of the invention in accordance therewith, FIG. 22 is a schematic diagram of the pneumatic circuit for actuating the welder head, and FIGS. 23 and 24 are diagrams of the electric circuit employed with a welding machine in accord with the invention.

The basic arrangement of the components of a machine in accord with the invention may be best appreciated from FIG. 1. The machine is supported on a base member generally indicated by the reference numeral 10 which includes the guide means for the work piece or article carriage and the guide means for the welder head. The work article carriage guide means consists of a pair of spaced parallel rail members 12 on which a carriage 14 is movably mounted by means of rollers engaging the tops and the inner surfaces of the rail members 12. The carriage 14 is provided with fixture means upon which the jig 16 holding the wires 18 forming the article to be welded is placed. Releasable clamp means are provided wherein the jig may be easily located upon or removed from the carriage.

The welder head is generally indicated by reference numeral 20 and is movably mounted upon a pair of spaced parallel guide or rail members 22. The guide members 22 extend below the rail members 12, and are perpendicularly disposed thereto. The electrode arms 24 and 26 mounted upon the welder head 20 project from the welder head in cantilever fashion wherein the upper and lower electrodes may be located above and below the article to be welded, as shown in FIG. 1. The guide members 22 are of sufficient length whereby the welder head supporting carriage 28 mounted on members 22 by rollers may move through a sufficient distance to permit the electrodes mounted on the ends of the arms 24 and 26 to be positioned at any location throughout the width between the rail members 12. It will therefore be appreciated that the combined displacements of the article carriage 14 and the welder head carriage 28 permits the welder electrodes to be vertically positioned above and below any location on the article held within jig 16.

As mentioned above, both the article and the welder head carriages are mounted upon roller members, in a conventional manner, which cooperate with the associated guide and rail members to permit the carriages to move in a linear direction. With reference to FIG. 3, the relationship of the welder head carriage 28 and supporting rollers 30 to the welder carriage may be appreciated. The carriage 14 and associated rollers have a similar relationship with the rails 12. Both the article carriage 14 and welder head carriage 28 are preferably actuated by means of hydraulic expansible motor means of a movable cylinder-fixed piston arrangement. The article carriage has an elongated cylinder 32 affixed thereto in parallel relation with the rail members 12 and the cylinder is located adjacent the front rail member as shown in FIGS. 2 and 15. The length of the cylinder 32 is substantially equal to that of the carriage 14 and the piston rod 34 thereof is of a length substantially equal to that of the rail members 12 and is affixed to the front rail. A piston member 36, FIG. 21, is affixed to the central region of the piston rod 34 and flexible conduit means communicate with the opposite ends of the cylinder wherein a pressurized fluid medium may be selectively introduced or removed from the cylinder spaces on the opposite sides of the piston.

The welder head carriage cylinder arrangement is of a similar construction, see FIG. 16, wherein the cylinder 38 is affixed to the welder head carriage 28. The piston rod 40 is affixed to the guide members 22, intermediate therebetween, by cross pieces 42 and 44, and extends the length of the guide members. Conduit members communicate with the welder head cylinder 38, on opposite sides of a piston 46 fixed to the piston rod, for supplying the pressurized fluid medium to the welder head carriage cylinder. Both the article carriage and welder head carriage cylinders are disclosed as being the type employing tension rods. However, it will be appreciated that any conventional cylinder construction may be employed.

Referring to FIG. 1, the location of the control and accessories required with the described embodiment of the invention will be apparent. At the front of the machine a control cabinet 48 is located having a hinged front panel 50. Upon the opening of the front panel 50 the control mechanism therein, as shown in FIG. 5, will be readily accessible for adjustment and maintenance purposes.

A control switchbox 52 is mounted upon the cabinet and includes a plurality of push-button switches for instigating the automatic operation of the machine, starting the pumps, permitting manual operation of the machine during the adjustment and set up phases and other necessary regulation. A cabinet 54, mounted at the left end of the machine, contains the electric relays, terminals, etc. necessary for the function and operation of the electrical components of the invention. The hydraulic pump and regulating valve structure necessary with the machine may be located at the rear portions thereof. The pumps are indicated by the reference numerals 56 and 56' and mounted upon a fluid reservoir 58. A vertical support column 60 mounted adjacent the pumps and reservoir support a plurality of solenoid actuated valves and the pressure regulators, filters, and other conventional devices employed with fluid circuits. In that compressed air is also employed by the invention, a compressed air supply line 62 may be affixed to the support column 60 to supply pressurized air to the machine. It will be noted that conduits 64 and 66 connect the control switch box with the cabinet 54 and the valves on column 60 with the cabinet 54, respectively.

The primary control valve and programming means for positioning the article carriage 14 and the welder head carriage 28 are located in cabinet 48, FIG. 5. Basically the control consists of an upper valve structure 68 which regulates and controls the position of the article carriage 14 and the lower valve structure, which is identical in construction to the valve structure 68, controls the positioning of the welder head carriage 28. Predetermined programming means are employed with each of these valves to determine the position thereof during each weld of the machine, and follow up means are employed between the carriage and the control valve associated therewith wherein the movement of the carriage instigated by the control valve may be sensed by the control valve.

In that the control valves 68 and 70 are identical in structure and operation only one control valve will be described in detail; namely, the article carriage valve 68. Primed reference numerals indicate like structure on valve structure 70. Referring to FIG. 5 and FIGS. 8 through 12, the control valve structure 68 includes a rear plate 72 which is mounted to the base 10 of the machine. A pair of transversely disposed end plates 74 and 76 are mounted upon the plate 74 and project transversely thereto, e.g. toward the observer as in FIG. 10. The valve body 78 is supported upon a pair of spaced parallel rods 80 and 82 interposed between the end plates 74 and 76. The rear rod 80 is fixedly mounted with respect to the end plates and the front rod 82 is received within bearings defined in the end plate for slidable axial movement thereto. The valve body 78 is provided with a pair of end plates 84 and 86 having wing members supporting annular bearings for slidably mounting the valve body upon the rods 80 and 82. It will therefore be appreciated that the valve body 78 is mounted for movement in a linear direction to the right or left as viewed in FIG. 10.

The arrangement of the internal valve body components is best shown in FIGS. 8 and 9 wherein it will be observed that the valve body includes a lower member 88 having a plurality of passages defined therein. The passages terminate in exterior threaded ports formed on the remote side of the body as viewed in FIG. 10 and flexible conduits, not shown, are affixed thereto for connection with the hydraulic circuit components as shown in FIGS. 21 and 22. The upper central region of the valve body includes the member 90 having a bore 92 defined therein. The member 90 is provided with a plurality of passages 94 in communication with the passages of the member 88. The end plates 84 and 86 are affixed to the ends of the members 88 and 90 and are provided with sealing means which cooperate with the spool element 96, as shown, to provide a sealed structure.

A ground valve sleeve 98 is fixed within the bore 92 and is provided with a plurality of annular ribs 100 which sealingly engage the walls of the bore 92 to provide a plurality of annular chambers adjacent the bore, each chamber being in communication with a passage 94. The sleeve 98 is provided with a plurality of radially extending ports which extend through the wall of the sleeve, each of the ports communicating with a different chamber. The valve spool element 96 is slidably received within the sleeve bore 102 and cooperates with the sealing means within the end plates to prevent the escape of fluid from the valve body. The spool element 96 extends beyond each of the end plates 84 and 86, and is recessed at 104 to provide a central spool member 106 and end spool portions 108. Pressurized fluid is supplied to the passage 110 from the pumps; passages 112 and 114 are connected to opposite ends of the cylinder 32 and passages 116 communicate with return or exhaust lines to the fluid reservoir. The control spool 106 is of a width equal to that of the central ports 118 wherein in the centered position, as shown in FIG. 8, the spool 106 will seal off the ports 118 and no fluid flow through the valve body will take place.

The follow-up means for the valve body 78 includes a pivot bracket 120 affixed to the end plate 86. The pivot includes a spherical ball 122 which is fixed to the bracket 120. A lever 124, which is a part of the article carriage sine bar follower, also includes a spherical ball 126 and a pair of parallel plates 128 having bearing elements with spherical recesses are drawn onto the balls 122 and 126 by means of a bolt 130. In that the bearings within plates 128 engage the balls at diametrically opposed positions, a pivotal connection between the lever 124 and the bracket 120 is achieved which is free of "play" or lost motion.

The left end of the valve spool element 96 is provided with a tapered feeler finger 132 which extends through a hole in the end plate 74 for engagement with a programming abutment screw, as will be later described. The right end of the valve spool element 96 is attached to the piston rod 134 of a fluid cylinder 136 mounted upon the end plate 76, a hole being provided in the end plate through which the piston rod extends. Upon actuation of the piston rod 134 the valve spool element 96 may be shifted to the right or left.

It is desired that the movement of the valve spool element be transmitted to the rod 82 and to this end a pair of split brackets 138 are employed. The brackets 138 are provided with a bore 140 which encompasses the valve spool and a bore 142 which encompasses the rod 82 and upon tightening of the screws 144 the spool element and rod 82 will be locked together. The underside of the rod 82 is provided with a notched portion which receives a hardened plate 146 which is held to the rod by screws, not shown. The plate 146 is provided with a notch or depression 148 which serves as a part of the "home" sensing apparatus. A lever 150 is pivotally mounted about the pivot 152, upon the end plate 86 and is located below the rod 82 and is provided with a feeler 154 having a pointed end which may be received within the notch or depression 148 upon the alignment therewith. A micro switch LS-2 is affixed to the valve body member 78 and includes a sensing element 156 which engages the end of lever 150 and senses the alignment of the feeler 154 with the notch 148.

The predetermined programming of the complete operational cycle is determined by a plurality of rotatably mounted drums or wheels 166–172 which are mounted within the cabinet 48. Referring to FIGS. 5, 19, and 20 the drums are rotatably mounted by conventional bearing means upon the rear cabinet wall 158. Each of the drums is provided with a chain sprocket 160, concentric to the rotation thereof, and an endless chain 162 operatively engages the sprockets of all four control drums. Motor means for driving the chain 162, generally indicated by reference number 164, is included within the cabinet 48 for indexing the chain and drums between successive weld cycles. The drum 166 predetermines the position of the article carriage 14, drum 168 locates the welder head carriage 28 for each weld and drum 170 is provided with means operating a micro switch for regulating the total number of welds in a cycle and for controlling other electric circuit operations of the machine. The drum 172 also controls micro switches and may be employed to regulate the current of the welded head electrodes and the weld time.

As will be apparent from the drawings, the control drums are of cylindrical configuration having a central hub portion, and an annular cylindrical flange 174 projects toward the viewer from the periphery of the hub, as illustrated in FIG. 5. Thus, the periphery of the control drums constitutes an annular axially extending flange through which a plurality of radially extending holes may be formed. The control drums 166 and 168 are provided with a flange having two rows of radial holes formed therein, as shown in FIG. 18. The holes of the different rows are staggered relative to each other, and are threaded to receive screw members 176. The screw members 176 may be conventional set screws having a flat outer end and a hexagonal recess formed in the end projecting toward the axis of the drum. A plurality of small threaded holes are axially defined in the flanges of the drums intersecting the larger threaded holes thereof for receiving set screws 178 to lock the screw members 176 in the desired radially adjusted position. Upon loosening the set screws 178 the operator may insert a hexagonal wrench into the hexagonal recess of the screw members 176 to rotate the members and then adjust radial extension from the flange 174.

The control drums 172 and 174 are formed with a flange of greater axial width than that of the control drums 166 and 168, and three or more rows of threaded holes may be defined thereon, as shown in FIG. 20. Conventional machine screws having heads may be inserted into these threaded holes and micro switches mounted upon a bracket 180 affixed to the rear wall 158 of the control cabinet sense the presence or absence of a bolt within a hole to control operations of the machine which will be later described. In the drum 172 illustrated in FIG. 20 three separate micro switches are operated by one control drum. The control drum 170 may also have a plurality of rows of threaded holes to receive bolts having heads, one row of bolts which may be engaged by the sensing element of a micro switch LS-5.

The indexing motor 164 for driving the chain 162 and causing the control drums to index between welds includes a sprocket 184 operatively associated with the chain. As illustrated in FIGS. 5 and 18, the indexing motor also includes a fluid cylinder 186 having a vertically movable piston rod 188. A pivoted lever 190 is mounted upon the piston rod establishing ratchet driving connection with the ratchet wheel 192. A locking dog 194 pivotally mounted upon the index motor frame engages the teeth of the ratchet wheel to insure unidirectional rotation thereof. The ratchet wheel 192 constitutes the input of a speed reduction transmission 196 having an output shaft upon which the sprocket 184 is affixed. Thus, upon each extension and retraction of the piston rod 188 the sprocket 184 and the control drums 166-172 will be indexed. The relationships of the index stroke with the interspacing between the holes defined in the control drum flanges is such that each index rotates the control drums a distance equal to the angular displacement between adjacent threaded flange holes.

It will be appreciated from FIG. 5 that the axes of the control drums 166 and 168 lie in the horizontal plane containing the axes of the spool elements of valves 68 and 70 respectively. Thus, the screw members 176 will successively align with the associated spool element axis and be available for abutment with the end of a valve spool sensing finger 132. The cross section configuration of the valve spool sensing finger is shown in FIG. 19 wherein it will be appreciated that the vertical thickness of the finger is less than that of the distance between adjacent threaded members 176 in the same row and the width of the finger spans both rows. The threaded holes formed in the control drums 166 and 168 of a common row are spaced apart an angular distance equal to twice that of the angular indexing thereof wherein the threaded member of different rows will alternatively align and be engaged by the valve finger 132. This construction permits a larger threaded member to be employed than would be possible if all the threaded members were in a single row for a given size control drum diameter. It will be appreciated that in FIG. 5 only a portion of the threaded members 176 mounted on a drum are shown for illustrative purposes.

The valve member follow up means for the article carriage is shown in FIGS. 2, 4, 13 and 14. To enable the control valve body 78 to be positioned in accordance with the position of the carriage 14 a sine bar 198 is affixed to the underside front portion of the carriage and extends in the longitudinal direction thereof. The sine bar 198 extends substantially the length of the carriage 14 and is supported by brackets 200 mounted upon the carriage and provided with an undercut shoulder 202 to receive the undercut shoulder 204 formed on the end of the sine bar, FIG. 14. The relationship between the brackets 200 and the sine bar 198 is such to prevent the sine bar from longitudinal shifting with respect to the carriage but permits the sine bar to be transversely displaced with respect thereto by mean of a sliding relation between shoulders 202 and 204. The sine bar is provided with bearing strips 206, FIG. 15, screwed to the surface thereof engaged by a cam follower roller 208. A sine bar back-up member 210 is fixed on the front rail member 12 and is provided with a bearing or wear strip 212 against which the sine bar 198 abuts as the carriage 14 is moved along the rail members. The back-up member 210 and the wear strip 212 extend the entire length of the rail members.

An L-shaped lever is pivotally mounted upon the front rail member 12 by a shaft 214, FIG. 15, for rotation in a horizontal plane. The lever portion 216, FIG. 4, mounts the cam follower 208 thereon and the lever member portion 124 extends into the control cabinet 48 having the ball 126 affixed thereto, as previously described. The lever portion 216 includes a plate 218 having a hole therein through which a shaft 220 extends. Each end of the shaft 220 is provided with a thread and the front end of the shaft is attached to the front rail member 12. The rear end of the shaft 220 has a nut and washer mounted thereon and a compression spring 222 is interposed between the washer and lever plate 218 thereby biasing the cam follower roller 208 into firm engagement with the sine bar. It will be appreciated that the spring 222 will insure engagement with the sine bar follower with the sine bar at all times and will also bias the sine bar into firm engagement with the bearing strip 212 of the back up member 210. As the carriage 14 is moved back and forth upon the rail members 12, the tapered configuraton of the sine bar will pivot the lever portion 124 in accordance with the position of the carriage and in a commercial embodiment of the invention the sine bar gives a 40 to 1 ratio of movement between the lever 124 movement and the carriage movement.

A similar functioning arrangement is used to sense the position of the welder head carriage 28. With reference to FIG. 16, a sine bar 224 is mounted to the underside of the carriage 28 by brackets 226 identical to the brackets 200 employed with the article carriage sine bar 198. As shown in FIG. 17, the sine bar 224 is provided with a wear strip 228 against which the cam follower roller 230 engages and a wear strip 232 is attached on the left guide member 22 which backs up the cam bar. The wear strip 232 extends the lentgh of the guide member 22. A lever 234 is pivotally mounted at 236 to a bracket 238 extending across the guide members 22 and at one end is provided with the sine bar follower 230 and at the other end with a ball 240 affixed therein which extends into the control cabinet 48 for association with the control valve structure 70. A rod 242 extends through a hole in the left guide member 22 and is pivotally mounted to the lever 234 at 244. A nut and washer assembly is affixed to the other end of the rod 242 and a compression spring 246 is interposed between the washer and bracket 248 affixed to the guide member. Thus, compression spring 246 maintains the sine bar follower roller 230 in engagement with the sine bar and the sine bar in engagement with the back up member wear strip 232. It will therefore be appreciated that as the welder head carriage moves back and forth toward and away from the article carriage 14 the ball 240 will move to the left and right under the influence of the sine bar.

Another feature of the invention relates to the use of a novel welding head structure. In that the article being welded will often require welds relatively displaced in a vertical direction the use of a conventional type of electric resistance welder head would limit the versatility of the machine. Conventional resistance welder heads fix one of the electrodes, usually the lower, and pivotally mount the upper electrode whereby it may be moved toward or away from the lower electrode. Thus, the welding action always takes place at the same horizontal position. In accordance with the invention the welder head includes a supporting structure 250 mounted upon the carriage 28, FIGS. 1, 2, 3, 6 and 7. The usual transformer may be located within the supporting structure 250 and the wiring, cooling means and accessories employed with this type of welded are not illustrated in FIGS. 6 and 7 for clarification of the unique aspects of the invention. A pivot shaft 252 is affixed to each side of the support structure 250 such that the axes of the pivot shafts align and in essence function as a single shaft. An upper U-shaped member 254 bridges the support member 250 and is pivotally mounted upon the pivot shafts 252. Likewise, a lower U-member 256 is also pivotally mounted upon the shafts 252 and extends below the front portion of the support 250. An extension 258 is affixed to the member 254 and a lower extension 260 is affixed to the U-shaped member 256. The upper and lower electrode arms 24 and 26 are mounted upon the extensions 258 and 260, respectively, by conventional attaching means, and the rearmost ends of the extensions are provided with holes which receive pivot pins 262 and 264. The pivot pins 262 and 264 pivotally mount an expansible motor consisting of a cylinder 266 and a piston rod 268 therebetween. In the described embodiment pressurized air is employed to actuate the motor and suitable conduits supply the cylinder from a control valve 270.

As shown in FIGS. 2, 6 and 7, a bracket 272 is pivotally mounted to the extension 258 and serves as an anchor for a tension spring 274 having a lower end adjustably affixed to the support member 250. A column 276 consisting of a pair of uprights, FIG. 1, on either side of the extension 258 mounts a shock absorber 278 which is affixed at the upper end to the column and at the lower end to the bracket 272. The extension 260 is provided with a rubber bumper 280 which engages an abutment 282 upon the support member in the extreme downward position of the lower electrode arm 26.

FIG. 6 illustrates the open position of the electrodes 284 and 286 wherein the piston rod 268 is retracted, the shock absorber will be extended and the spring 274 is contracted to its minimum length. Upon the introduction of a pressurized medium, air in the instant embodiment, into the cylinder 266, the lower extension 260 and electrode 286 pivot prior to the movement of the upper extension and electrode 284 due to the influence of the spring 274 resisting pivoting of the upper extension. This operation insures that the lower electrode 286 will engage the underside of the article to be welded prior to the upper electrode 284 engaging the upper part of the weld location. As the lower extension 260 is pivoting to raise the electrode 286 the upper extension will also move to lower electrode 284. However, the resistance to pivoting of extension 258 caused by spring 274 will cause the upper electrode movement to lag behind the lower electrode. Upon the lower electrode engaging the article to be welded the resistance to further movement of the lower electrode will cause the upper extension and electrode to engage the upper portion of the weld location as all of the piston rod movement will be imposed on extension 258. FIG. 7 illustrates the location of the electrodes upon the lower electrode engaging the underside of the weld location prior to the final movement of the upper electrode.

FIG. 7A shows a variation in the spring arrangement biasing the upper extension 258 which provides a more uniform biasing force due to reduced spring movement. A rod 271 is pivotally mounted to member 254 by pin 273 and is biased to the left by compression spring 275 acting on the rod end 277 and against the welder frame. As pin 273 is close to pivot 252, the spring 275 will vary little in length in providing biasing.

The previously described construction of the welder head permits the welder head to make a weld at any vertical location between the electrodes as shown in the open position of FIG. 6. This automatic compensation of the vertical position of the weld location is due to the self-adjusting feature arising from pivotally mounting both the upper and lower electrodes and interposing the motor means actuating the electrodes between the extensions 258 and 26, rather than between a fixed member and the extensions. The use of the shock absorber 278 and the rubber bumper 280 dampen the rapid opening movement of the electrodes and cushion the members as they arrive at their extreme open positions.

As will be noted from FIG. 5, micro switches LC-6 and LS-7 are affixed on the end plates 76 of the valve members 68 and 70, respectively. Abutment means are associated with the valve bodies for actuation of the micro switches LS-6 and LS-7 upon extreme movement of the valve bodies to the right, which is the carriage's "home" position. Also, a micro switch LS-1 is mounted adjacent to the index motor piston rod 188 extreme extension position having a sensing member actuated by the piston rod during the end of each stroke of the piston rod. The switch LS-1 controls the actuation of the index motor as will be later described.

The operation of the automatic welding machine is as follows:

With reference to the circuit diagrams of FIGS. 23 and 24 the welding machine circuit is shown as completely de-energized. To initially start the machine the operator first momentarily depresses push button PB-1 which closes the first pump motor relay M-1 to energize the first pump motor 56 directly with 220 volts. Push button switch PB-3 is then depressed to energize pump motor relay M-2 which starts the second pump motor 56'. Relays M-1 and M-2 include contacts connected in series which, upon energization of M-2, permit relay CR-1 to be energized which provides voltage to the remainder of the control.

For automatic operation, the selector switch SS-1 is placed in the AUTO position which closes the contacts indicated in FIG. 23 energizing relay CR-A and causing the indicator light R-1 to glow. In that the article carriage 14 and the welder head carriage 28 were returned to their "home" positions, e.g. the article carriage extreme right position and the welder carriage full back position, FIG. 1, before the machine was stopped, normally open limit switches LS-6 and LS-7 will be closed and hence relay CR-5 will be energized upon the operation of SS-1.

After the operator has clamped a loaded FIG. 16 upon the carriage 14 the machine is now ready to operate automatically through the predetermined cycle wherein a plurality of spaced welds will be made on the jigged article components. To initiate the automatic cycle push button switch PB-11 is depressed and is maintained closed by the operator until the article and welder carriages have begun to move. This time delay prevents the control relay CR-2 and CR-3, which are energized by PB-11, from prematurely de-energizing. CR-2 locks itself in the circuit by one of its own contacts in series with a normally closed contact of control relay CR-5.

Upon the energization of CR-2 and CR-3 the solenoids SOL-2 and SOL-3 will be energized to shift the spring biased 4-way valves 288 and 290, respectively. The valve 288 controls the flow of fluid to the valve spool control cylinder 136'. As seen in FIG. 21, the energization of SOL-2 and SOL-3 will shift the valves 288 and 290 to the left wherein the piston rods 134 and 134' will likewise move to the left to place the sensing fingers 132 and 132' into abutting engagement with the locating screws 176 mounted on the drums 166 and 168 determining the locations of the carriages for the first weld.

At the same time SOL-2 and SOL-3 are energized, the time delay relay TD-2 is energized and provides a sufficient time lag to permit the valve spool sensing fingers to firmly seat on the locating screws 176. Thereafter, TD-2 closes the circuit which energizes solenoids SOL-4 and SOL-5 and time delay relays TD-3 and TD-7.

SOL-4 is operatively associated with the spring biased 2-way valve 292 which connects primary control valve 68 with the pressurized fluid. Likewise, SOL-5 operates a valve 294 controlling the supply of pressurized fluid to the welder carriage control valve 70. Thus, upon energization of SOL-4 and SOL-5 fluid may flow through the valves 68 and 70 into the cylinders 28 and 38 to position the article and welder head carriages.

As soon as the carriages 14 and 28 being moving, switches LS-6 and LS-7 will open and de-energize relay CR-5. A normal closed contact in CR-5 now latches CR-2 and push button switch PB-11 can be released.

As the carriages 14 and 28 move toward their predetermined positions for the first weld, their movement is sensed by the respective sine bar follower rollers and levers and the valve body members 78 and 78' will be moved toward the "null" position, e.g. centering of the valve central spool 106 over ports 118 as in FIG. 8. The delay determined by TD-3 and TD-7 is such that these relays will de-energize SOL-4 and SOL-5, respectively, to close their associated valves just as the carriages reach their proper positions whereby the valves will "null" themselves into position. Switch contacts on TD-3 and TD-7, connected in series, delays energization of CR-4 until the longer of the two relays is closed.

Upon the valves 68 and 70 reaching the "null" position, indicating proper locating of the article and welder head carriages, the pointed ends of the feelers 154 and 154' will engage the notches 148 and 148' permitting the levers 150 and 150' to pivot slightly and open the normally closed switches LS-2 and LS-3, which de-energize TD-3 and TD-7. While relay CR-4 was energized by TD-3 nad TD-7 a normally open contact on CR-4 is used to close a parallel path around TD-3 and TD-7 to maintain CR-4 energized.

The primary purpose of the relay CR-4 is to initiate the weld operation which is controlled by a conventional weld timer, such as that available under the trade name Robotron. Relay CR-8 is energized by the weld timer circuit and causes the relay CR-3 and solenoid SOL-6A to be de-energized and energizes the solenoid SOL-6B. As shown in FIG. 21 solenoids SOL-4A and SOL-6B control the valve 270 which controls cylinder 266 to open and close the welder electrode arms and upon energizing SOL-6B the piston rod 268 is extended to close the electrode arms to bring the electrodes into opposed engagement with the location to be welded and the weld takes place. Upon CR-3 being de-activated, time delay relay TD-2 and SOL-2 and SOL-3 are held in the circuit only by CR-4. A normally closed contact on CR-3 prepares the activation of time delay relay TD-6.

After the weld is made the weld timer circuit will de-energize CR-8 which de-energizes SOL-6B and energizes SOL-6A through a normally closed CR-8 contact, to open the welding arms. At this time the delay relay TD-6 becomes energized which permits the weld time circuit controls to reset. Upon timing out, TD-6 de-energizes CR-4 and energizes solenoid SOL-1 which operates the 4-way valve 296 controlling the operation of the ratchet index motor 164. Upon CR-4 being de-energized, SOL-2 and SOL-3 will be de-energized causing the valves 288 and 290 to operate cylinders 136 and 136' to retract the valve spool sensing fingers 132 and 132' from engagement with the positioning screws 176 thereby eliminating the possibility of the fingers from interfering with the control drum indexing. Upon the piston of expansible motor 164 being fully extended it engages the limit switch LS-1 which has both normally open and normally closed contacts. Upon piston rod 188 actuating LS-1 the normally closed contacts thereof open the circuits to TD-1, TD-2, SOL-2 and SOL-3 preventing these circuits from being energized until the controls are ready for the next cycle. Upon the normally open contacts of LS-1 closing, control relay CR-3 will be energized which completes the first weld cycle.

CR-3 latches itself across the line through one of its contacts in series with a normally closed contact on CR-8 and a contact on CR-3 closes the circuit to TD-2, SOL-2 and SOL-3; however, this circuit cannot become energized until LS-1 is de-activated. A contact on CR-3 de-energizes time delay relay TD-6 which de-energizes SOL-1 and retracts the ratchet motor piston rod 188 and releases LS-1. Thereupon, the normally closed contact of LS-1 energizes TD-2, SOL-2 and SOL-3 which then shifts the valve spool sensing fingers 132 and 132' into engagement with the next programming screws 176 which have been newly aligned with the fingers.

The machine now begins its second weld cycle and each cycle thereafter, except the last, will be identical to that described above. A programming screw 176 is radially positioned in each of the control drums 166 and 168 for each weld and the machine will automatically index the control drums one position for each weld to make the desired number of welds at the desired position.

The number of positioning screws in the control drums 166 and 168 corresponds to the number of welds to be made plus one. The last positioning screw in each drum is located to return the article and welder carriages to the "home" position, FIG. 1, and the welder moves to its rearmost location.

A limit switch LS-5 is located adjacent the control drum 170 and a reset screw 298 is mounted on drum 170 for activating LS-5 slightly before LS-1 is engaged by the ratchet motor piston rod as the "home" positioning screws are indexed into alignment with the valve sensing fingers. LS-5 energizes relay CR-6 which allows time delay relay TD-1 to be energized after the carriages have reached the home position.

Upon the article and welder carriages reaching the "home" position the resultant movement of the valve bodies 78 and 78' will cause the valve bodies to engage time switches LS-6 and LS-7, respectively. Activation of both LS-6 and LS-7 will energize CR-5 which in turn de-energizes CR-2 and energizes TD-1 through the previously closed contact of CR-6 and normally closed contact of LS-1, which was released when the ratchet motor piston retracted. De-energizing CR-2 permanently de-energizes SOL-2, SOL-3, TD-2, SOL-4, SOL-5, TD-3 and TD-7 terminating the "homing" operation.

Upon TD-1 timing out, SOL-1 is energized to index the ratchet motor and the control drums one position. If all of the available positions of the programming drums 166 and 168 were employed during the complete welding cycle this last indexing would properly locate the control drums for the first weld of the next article. However, usually several indexes of the control drums are necessary to position the screws for the beginning of the next cycle and a sufficient number of reset screws 298 are mounted on drum 170 to activate LS-5 upon each indexing until the beginning of the programming cycle is reached. During this operation each extension of the ratchet motor causes LC-5 and CR-6 to drop out until the drums advance to their next position whereupon reactivation of LS-1, LS-5 and CR-6 temporarily de-energizes TD-1. With CR-6 activated after LS-1 drops out TD-1 energizes SOL-1 again and the drums are rapidly indexed until the absence of a reset screw indicates that the drums are ready for the next weld cycle. At this point CR-8, LS-6, LS-7, CR-5, CR-3 and SOL-6A all remain energized.

While the article carriage 14 is in the home position the welded article is removed from the carriage and the unwelded components of the next article to be welded are positioned on the carriage. After the unwelded jigged article is clamped upon the article carriage the welding cycle can again be initiated by depressing switch button PB-11.

The limit switches employed with control drum 172 may be used to control such operations as changing the welding pressure, current and times for particular welds. Often longer weld times and higher or lower weld temperatures are required if the components being welded vary in size and shape and the switches associated with drum 172 may be activated by screws located on the drum to control such operation through proper conventional connection to the welder timer control circuit. For instance, switch LS–8, FIG. 22, may be used to control a valve 300 which controls the air pressure introduced into cylinder 266 by switching the air supply between pressure regulators. Thus, depending on the presence or absence of an actuating screw in drum 172, the weld pressure will either be the high or low valve and will be controlled during each weld.

From the foregoing description of the invention it will be appreciated that a very wide range of diversely located welds may be successively formed on an article. The very accurate control obtained by the hydraulic positioning and mechanical sensing means permits the forming of a weld anywhere in the horizontal plane of the carriage travel intersected by the path of movement of the welder electrodes. Also, in that the welder structure permits the welds to be displaced from a common horizontal plane a flexibility and versatility heretofore unknown in automatic welding machines is possible. From a practical standpoint the number of welds which may be formed during a complete weld cycle are only limited by the number of positioning screws 176 which might be located on a single drum. By increasing the diameter of the control drums the number of screws which may be accommodated may be increased or the size of the screws may be reduced. It has been found that by using a 5° drum index that the 72 positions available will meet most welding requirements.

It is contemplated that the complete welding cycle time may be reduced by employing slight variations in the circuitry whereby the indexing of the control drums for the next weld location may occur while the welding at the previous location is taking place. To this end the initiation of the weld timer circuit would also initiate the control drum indexing and positioning of the control valves; however, movement of the welder and article carriage is prevented until the welder arms are fully open.

Also, the versatility of the apparatus may be increased by pivotally mounting the article jig upon the article carriage whereby the article may be tilted to produce welds which do not lie in a vertical line when the article is horizontal. Such pivoting of the article can be produced by an air cylinder controlled by a switch sensing screw mounted on drum 170, for instance.

It is appreciated that many variations of the inventive concept may be apparent to those skilled in the art and it is intended that the invention be defined only by scope of the following claims.

We claim:

1. Automatic welding apparatus comprising, in combination, a first frame member, a first carriage movably mounted upon said frame member, a second carriage movably mounted upon a second frame member for movement in a direction transverse to the direction of movement of said first carriage, means mounting an article to be welded upon said first carriage, a welder mounted upon said second carriage having welding members selectively engageable with the article to be welded and control means operatively associated with said first and second carriages automatically positioning said first and second carriages relative to each other during each operation of the welder.

2. Automatic welding apparatus for welding an article having a plurality of spaced welds comprising, in combination, a first frame member, a first carriage movably mounted on said frame member, means mounted on said frame member operatively positioning said first carriage, a second carriage movably mounted on a second frame member in a direction transverse to the direction of movement of said first carriage, means mounted on said second frame member operatively positioning said second carriage, means mounting the article to be welded upon said first carriage, a welder having welding members selectively engageable with the article to be welded mounted on said second carriage, and automatic control means operatively associated with said welder and said means positioning said carriages actuating said carriage-positioning means in a predetermined cyclic relationship whereby said welder cyclically forms said welds.

3. Automatic electric welding apparatus for welding an article having a plurality of spaced welds comprising, in combination, a first frame member supporting a carriage movable thereon, means movably positioning said carriage, means mounting said article to be welded upon said carriage, a welder movably mounted upon a second frame member, means movably positioning said welder in a direction transverse to the direction of movement of said carriage, welding members mounted on said welder positionable for engagement with said article, automatic control means operatively associated with said means positioning said carriage, automatic control means operably associated with said means positioning said carriage and said welder, and means actuating said welder upon said carriage and welder arriving at predetermined positions.

4. Automatic welding apparatus for welding an article having a plurality of spaced welds comprising, in combination, a first frame member supporting a carriage movable thereon, holding means maintaining said article to be welded upon said carriage, a cylinder mounted upon said carriage, a piston operatively associated with said cylinder and fixed with respect to said frame member, a second frame member disposed transversely to said first frame member, a welder movably mounted upon said second frame member, a second cylinder mounted upon said welder, a second piston operatively associated with said second cylinder fixed with respect to said second frame member, welding members mounted on said welder positionable for engagement with said article to be welded, hydraulic control means operatively associated with said first and second cylinders, follow up means operatively interconnecting said control means and said carriage and said control means and said welder, means controlling operation of said welding members, indexable hydraulic control positioning means determining the position of said hydraulic control means, carriage and welder during each operation of said welding members and means indexing said positioning means upon the completion of each operation of said welding members.

5. In an automatic welding apparatus as in claim 4 wherein said welder is of the electric resistance type and said welding members comprise a pair of arms having electrodes mounted thereon disposed on opposite sides of the article to be welded.

6. Automatic welding apparatus for welding an article having a plurality of spaced welds comprising in combination, a base, a carriage movably mounted upon said base, a holder mounted on said carriage holding the article to be welded, first cylinder and piston structure operatively interposed between said base and carriage adapted to move said carriage thereon, an electric resistance welder movably mounted on said base for movement in a direction transverse to the direction of carriage movement, a pair of welding electrodes mounted on said welder positioned on opposite sides of the article to be welded, second cylinder and piston structure operatively interposed between said welder and base, an hydraulic fluid pressure source, first and second valve means operatively associated with said pressure source and said first and second cylinder and piston structures, respectively, preadjusted valve positioning means operatively associated with said first and second valve means determining the position of said valve means, said carriage and said welder for each weld operation, means shifting a new preadjusted valve positioning means into operative relation to said valve means upon the completion of each weld and valve follow-up means operatively interconnecting said carriage and first valve means and said welder and said second valve means whereby movement of said carriage and welder is sensed by the associated valve means.

7. In an automatic welding apparatus as in claim 6 wherein said valve positioning means comprises a plurality of threaded elements threaded into radially extending holes defined in a rotatable fixed axis support member, said valve means including means selectively engaging the ends of said threaded elements thereby sensing the radial extension of the engaged element relative to said fixed axis.

8. In an automatic welding apparatus as in claim 6 wherein said valve follow-up means includes a first sine bar mounted on said carriage for movement therewith, a sine bar follower mounted on said base engaging said sine bar, said sine bar follower operatively interconnected with said first valve means, a second sine bar mounted on said welder for movement therewith and a second sine bar follower mounted on said base engaging said second sine bar operatively interconnected with said second valve means.

9. Automatic welding apparatus for welding an article having a plurality of spaced welds comprising, in combination, a base, a carriage movably mounted upon said base, a holder mounted on said carriage holding the article to be welded, first cylinder and piston structure operatively interposed between said base and carriage adapted to move said carriage thereon, an electric resistance welder movably mounted on said base for movement in a direction transverse to the direction of carriage movement, a pair of welding electrodes mounted on said welder positioned on opposite sides of the article to be welded, second cylinder and piston structure operatively interposed between said welder and base, an hydraulic fluid pressure source, first and second valve means operatively associated with said pressure source and said first and second cylinder and piston structures respectively, a rotatably mounted valve control member associated with each of said first and second valve means, a plurality of radially extending abutments mounted on said valve control members, each of said valve means having a sensing means selectively engaging with and located by said abutments whereby regulation of said valve means is achieved, means rotatably indexing said valve control members upon completion of a weld to present a different abutment into engagement with said valve sensing means and valve follow-up means operatively interconnecting said carriage and first valve means and said welder and said second valve means whereby movement of said carriage and welder is transmitted to the associated controlling valve means.

10. Automatic welder apparatus comprising, in combination, first and second frame members having guide elements formed thereon, said second frame member guide elements being transversely disposed to the guide elements of said first frame member, a first carriage supporting the article to be welded movably mounted upon the guide elements of said first frame, said article having a plurality of spaced welds generally located in the plane of movement of said article, an electric welder mounted upon a second carriage movably mounted upon the guide elements of said second member, opposed electrode members mounted on said welder disposed on opposite sides of the plane of article movement, operating means operatively associated with said electrode members, first and second drive means operably associated with said first and second carriages, respectively, first and second control means respectively operatively associated with said first and second drive means, first follow-up means interposed between said first control means and said first carriage, second follow-up means interposed between said second control means and said second carriage, said control means including a plurality of predetermined sequentially employed operative positions, means energizing said electrode member operating means upon both of said control means achieving a predetermined operative position and means varying the operative position of said control means to change the relationship of said first and second carriages upon the completion of the operation of said electrode operating means.

11. In an automatic welding apparatus as in claim 10 wherein said welder comprises pivotally mounted arms supporting each of said electrode members, said means operatively associated with said electrode members pivotably actuating said arms to move the electrode members toward each other upon said control means achieving said predetermined position.

12. Automatic electric resistance welding apparatus comprising, in combination, an electric welder having a base, a pair of electrodes mounted on said base for welding an article located therebetween, support means mounting the article to be welded, drive means operatively associated with said support means for moving said support means relative to said welder, pre-programmed control means controlling said drive means whereby the locations upon said article to be welded are successively located between said electrodes, electrode actuation means closing said electrodes toward each other, pre-programmed second control means regulating said electrode actuation means determining the pressure exerted on the article being welded by said electrodes during each weld and pre-programmed electric current control means operatively associated with said electrodes regulating the current supplied to said electrodes for each weld, said pre-programmed control means being deactivated and energized for each weld operation of said electrodes.

References Cited in the file of this patent

UNITED STATES PATENTS

| | | |
|---|---|---|
| 853,241 | Helberger | May 14, 1907 |
| 1,074,383 | Rietzel | Sept. 30, 1913 |
| 1,554,385 | Still | Sept. 22, 1925 |
| 1,645,705 | Ledwinka | Oct. 18, 1927 |
| 1,703,588 | Meadowcraft | Feb. 26, 1929 |
| 2,063,257 | Martin | Dec. 8, 1936 |
| 2,079,042 | Saives | May 4, 1937 |
| 2,190,692 | Bitler et al. | Feb. 20, 1940 |